(12) United States Patent
Moc

(10) Patent No.: US 6,526,845 B2
(45) Date of Patent: Mar. 4, 2003

(54) ATTACHABLE HANDLE FOR STEERING WHEELS

(76) Inventor: Peter Chi Moc, 422 S. Garfield Ave. #F, Monterey Park, CA (US) 91754

( * ) Notice: Subject to any disclaimer, the term of this patent is extended or adjusted under 35 U.S.C. 154(b) by 0 days.

(21) Appl. No.: 09/829,697

(22) Filed: Apr. 10, 2001

(65) Prior Publication Data

US 2002/0007694 A1 Jan. 24, 2002

Related U.S. Application Data

(60) Provisional application No. 60/218,127, filed on Jul. 13, 2000.

(51) Int. Cl.[7] ............................................. G05G 1/10
(52) U.S. Cl. ............................................. 74/557; 74/553
(58) Field of Search .......................... 74/552, 553, 556, 74/557, 558.5, 523

(56) References Cited

U.S. PATENT DOCUMENTS

| | | | | |
|---|---|---|---|---|
| 1,861,586 A | | 6/1932 | Shipley | |
| 2,101,519 A | * | 12/1937 | Thorp | 74/557 |
| 2,267,308 A | * | 12/1941 | Russell et al. | 74/557 X |
| 2,274,069 A | * | 2/1942 | Johnson | 74/552 X |
| 2,432,262 A | * | 12/1947 | Thorp | 74/553 |
| 2,441,061 A | * | 5/1948 | Deer | 74/557 |
| 2,475,858 A | * | 7/1949 | Riemann | 74/557 X |
| 2,482,641 A | | 9/1949 | Stites | 74/557 |
| 2,567,901 A | * | 9/1951 | Wood | 74/557 |
| 2,710,138 A | * | 6/1955 | Burrows | 74/553 |
| 2,733,617 A | * | 2/1956 | Schmidt | 74/557 |
| 2,790,330 A | * | 4/1957 | Sinko | 74/557 |
| 2,932,982 A | * | 4/1960 | Enders | 74/557 |
| 3,776,064 A | * | 12/1973 | Rose | 74/557 |
| 5,289,736 A | | 3/1994 | Fujimori | 74/557 |
| 5,520,071 A | | 5/1996 | Jones | 74/557 |
| 5,585,578 A | * | 12/1996 | Shimotori | 74/557 X |

FOREIGN PATENT DOCUMENTS

IT   608044   9/1960

* cited by examiner

Primary Examiner—David A. Bucci
Assistant Examiner—Colby Hansen
(74) Attorney, Agent, or Firm—Mark A. Pilgrim

(57) ABSTRACT

A new and useful invention is an attachable steering wheel rotating apparatus having the following qualities: friendly on the user's hand, friendly to the steering wheel, pleasing to the eyes, and above all a reliable yet simple and quick attachment and detachment system.

5 Claims, 1 Drawing Sheet

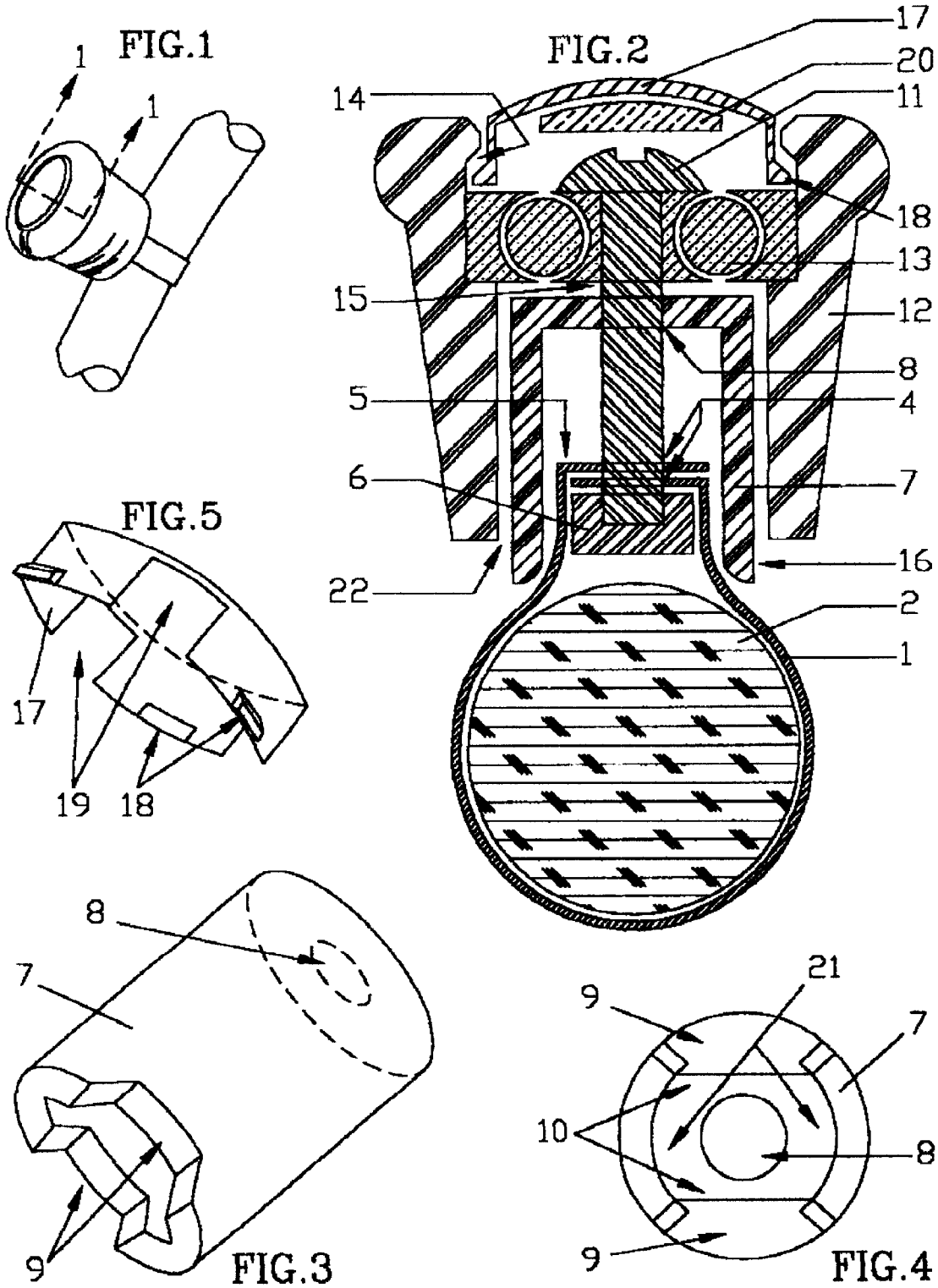

ATTACHABLE HANDLE FOR STEERING WHEELS

CROSS-REFERENCE TO RELATED APPLICATIONS

This application references my previously filed Provisional Patent Application on Jul. 13, 2000 entitled the same "Attachable Handle for Steering Wheels" with the application Ser. No. 60/218,127.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates to a hand control attachment apparatus used on a steering wheel or the like. It is more commonly known as a steering knob or a detachable spinner which can be mounted as an accessory on the rim of an automobile steering wheel or the like to facilitate turning with just one hand in a more natural position, as well as minimize fatigue overall.

2. Description of the Prior Art

The following is a list of patents which are considered relevant to this invention: Shipley (U.S. Pat. No. 1,861,586), Deer (U.S. Pat. No. 2,441,061), Stites (2,482,641), Rose (U.S. Pat. No. 3,776,064), Fujimori (U.S. Pat. No. 5,289,736), Jones (U.S. Pat. No. 5,520,071), and foreign patent number 608,044 (Italy, 09/1960). The problems with these spinners in the past have been their cumbersome sizes and their troublesome installation and detachment . . . all of which have made them unsafe for use. They require a time consuming process of first figuring out how to put one on and then going through the many steps of adjustments to get one on to fit just right. After all the work, one is stuck with an ugly bulging handle that has proven in the past to be most unpleasant to knuckles, fingers, and nails.

BRIEF SUMMARY OF THE INVENTION

For the first time, the essential supporting base will be hidden inside the steering knob to minimize occupied space and damage to the steering wheel. This new spinner locks to any wheel the same way in the fewest steps possible. Not only does this new steering knob eliminates all the false of previously made spinners, it goes beyond to introduce an interchangeable top. It will appeal to those who want to personalize their spinner by allowing a custom image to be the center of attention or to change the feel of their spinner from time to time.

BRIEF DESCRIPTION OF THE SEVERAL VIEWS OF THE DRAWING

The drawings are presented in an order which best describes the invention as it is being applied for use. The next section which repeats this order will go into details to show the importance and benefits of each piece with regards to the next. There are no specified dimensions stated in the drawings, however the relative sizes of all the parts are implied.

FIG. 1 is a perspective view of a steering knob in accordance with the principles of the present invention that is secured on a partially shown steering wheel.

FIG. 2 is a cross-sectional view of the steering knob as shown in line 1—1 of FIG. 1. In the drawing, gaps are left between certain parts for clarity purposes only.

FIG. 3 is a perspective view of the supporting cylinder.

FIG. 4 is a bottom plan view of the supporting cylinder.

FIG. 5 is a perspective view of the cap.

DESCRIPTION OF THE INVENTION

A first look at this steering knob reveals its obvious simplicity and neatness as shown in FIG. 1. Unlike the other steering knobs in the past, there is no exterior supporting base made from stiff metal that harms the user's hand and damages the nice leather rim of most steering wheels. Instead, a soft, flexible but strong strap 1 which takes a pre-formed ring shape, as shown in FIG. 2, wraps around the rim of the steering wheel 2. Strap 1 has a round hole 4 at each of its end. In addition, both ends overlap to where their holes 4 align. The length of the overlap is proportional to the width of a square nut 6. The overlap portion is elevated outward from the rest of the ring to form somewhat of a house 5 to fit the square nut 6. This feature helps the user to get a general idea of where each piece goes and to save time and hassle of bending the strap 1 to accommodate for the size of the rim of the steering wheel 2 and square nut 6. Once the strap 1 is on the steering wheel 2 and the square nut 6 is resting in the house 5 on top of the steering wheel 2, then the supporting cylinder 7 is ready to engage them. It takes the place of all the unattractive supporting bases found in prior arts. The supporting cylinder 7, as shown in FIG. 3, has a round opening hole 8 at the top end and two saddles 9 at the other end. The saddles 9 provide a nesting place for the rim of the steering wheel 2. The strong and rigid supporting cylinder 7 has a unique inside as shown in FIG. 4. The interior walls 10 are flat, not round, at the two sides where the saddles 9 are. Their distance apart is a little bit more than the side of the square nut 6. Their sole purpose is to keep the square nut 6 from turning so that it will travel up the machine screw 11 (FIG. 2) at time of tightening. The interior walls 10 do not have clearance for the square nut 6 inside the house 5. However, the other two curved interior walls 21 do have the room. In other words, the user can rest assure that if the supporting cylinder 7 falls is place over the house 5, then the saddles 9 will run along the rim of the steering wheel 2. Also, the cylinder opening hole 8, the strap holes 4 and the square nut 6 will all be in alignment for the machine screw 11 to travel through. The actual soft cushioned knob 12 (FIG. 2) is molded to a radial ball bearing 13 inside. The radial ball bearing 13 allows the knob 12 to spin independently around the screw 11 which otherwise would cause rotational friction that can loosen the apparatus over a period of time. The use of the radial ball bearing 13 is a new feature unknown to previously made spinners. The top of the knob 12 is open with a groove 14 along its inner rim. The radial ball bearing 13 comes with a central hole 15 sized to allow the machine screw 11 to pass through. The space under the radial ball bearing 13 is an open cavity 22 slightly big enough to store the supporting cylinder 7. Thus, the supporting cylinder 7 is hidden inside the knob 12 for the most part with the exception of its bottom end 16 reaching pass the bottom end of the knob 12. This is so that the knob 12 itself does not touch the rim of the steering wheel 2 in order for it to spin. Never has the supporting base of past inventions take the form of a cylinder that is conveniently placed inside the rotary knob. It is out of sight and completely out of harms way. At this point, the user simply has to turn the machine screw 11 with the use of a screwdriver to tighten the whole apparatus. As the machine screw 11 turns it draws the square nut 6 upward which in turn pushes the ends with the holes 4 of the strap 1 closer and closer to the opening hole 8 at the top of the supporting cylinder 7. In affect, the ring portion of the strap 1 becomes smaller and therefore wraps tighter around the steering wheel 2. Eventually, the rim of the steering wheel 2 will settle deep into the saddles 9 of the supporting cylinder 7. This prevents any slipping and sliding of the whole handle. It should also be noted that the machine screw 11 is long enough to reach the square nut 6 without ever touching the steering wheel 2. The tightening process basically brings everything closer together and locks them there. The ease and quickness of a single band with a single screw and nut attachment is definitely a well distinguished feature absent in the old inventions. Furthermore, the intuitive nature on how the parts fit together simply by looking at them surpasses the other attachable hand control apparatus in the past.

The addition of a removable cap 17 further makes this invention different from the rest. As shown in FIG. 5, cap 17 has evenly spaced teeth 18 and open pockets 19 to provide as a mean of snapping on and off the top of the knob 12 at the groove 14. It covers the head of the machine screw 11 when it is not in use. The cap 17 is the most versatile part of this invention. For example, it can be clear to allow an image laying underneath it to show through. There would be a thin cushion 20 (FIG. 2) between the cap 17 and the head of the machine screw 11. This cushion 20 adjusts for the thickness of the material the image is on to always have the image held flat to the inside of the cap 17. The top of the cap 17 can also be made with other characteristics such as leather, fur, velvet, squeezable rubber, etc. Both the cap 17 and the knob 12 can be made from materials that glow in the dark. As the steering knob is an accessory to the steering wheel, the interchangeable cap is an accessory to this particular steering knob.

What I claim as my invention is:

1. A steering wheel apparatus comprising:

a screw;

a nut for receiving the screw;

a strap comprising a first end having a first hole and a second end having a second hole, wherein the strap is formed around a steering wheel rim, such that the first end and the second end overlap forming a house for placing the nut therein and facilitating alignment of the first hole with the second hole;

a supporting cylinder having a top end and a bottom end, the supporting cylinder top end having a third hole, the supporting cylinder bottom end having at least two saddles for holding the steering wheel rim, wherein the saddles define flat interior walls and curved interior walls adapted to engage the nut and the strap respectively upon tightening of the screw; and a rotary knob having a radial ball bearing, the rotary knob further having a top end and a bottom end, wherein the rotary knob top end is grooved, and the rotary knob bottom end is shaped to enclose the supporting cylinder, the radial ball bearing having a fourth hole; wherein the body of the screw extends through the first hole, the second hole, the third hole, and the fourth hole, and wherein the radial ball bearing engages the head of the screw such that the rotary knob spins independently around the screw.

2. The apparatus of claim 1, wherein the overlap of the first end and the second end restrict rotational movement of the nut.

3. The apparatus of claim 1, wherein the strap is preformed to fit around the steering wheel rim.

4. The apparatus of claim 1, further comprising a cap having teeth and open pockets, wherein the teeth are received into the rotary knob top end groove.

5. The apparatus of claim 4, further comprising a cushion located between the cap and the head of the screw.

* * * * *